United States Patent [19]
Uemura et al.

[11] Patent Number: 5,980,085
[45] Date of Patent: Nov. 9, 1999

[54] FOLDING LINE GENERATION METHOD FOR BENDING AND BENDING SYSTEM BASED THEREON

[75] Inventors: Gen Uemura; Naomichi Mori, both of Kanagawa, Japan

[73] Assignee: Amada Metrecs Company, Limited, Kanagawa, Japan

[21] Appl. No.: 08/994,486

[22] Filed: Dec. 19, 1997

[30] Foreign Application Priority Data

Apr. 8, 1997 [JP] Japan ..................................... 9-209148

[51] Int. Cl.⁶ .............................. G06F 19/00; B21D 5/02
[52] U.S. Cl. ............................... 364/468.03; 364/469.01; 364/472.01; 364/474.07
[58] Field of Search ..................... 364/469.01, 468.01, 364/468.03, 468.04, 469.03, 471.01, 474.07, 472.01; 264/40.1, 40.5, 285, 295, 319, 320; 72/702

[56] References Cited

U.S. PATENT DOCUMENTS

| | | | |
|---|---|---|---|
| 3,860,803 | 1/1975 | Levine | 364/468.04 |
| 4,495,582 | 1/1985 | Dessert et al. | 364/469.03 |
| 4,912,644 | 3/1990 | Aoyama et al. | 364/468.04 |
| 5,822,207 | 10/1998 | Hazama et al. | 364/468.03 |

*Primary Examiner*—William Grant
*Assistant Examiner*—Steven R. Garland
*Attorney, Agent, or Firm*—Greenblum & Bernstein P.L.C.

[57] ABSTRACT

In a bending simulation apparatus, after a three-dimensional drawing generation portion generates a solid form from trihedral drawing data, a workpiece bending simulation portion places a workpiece for forming edge angles of a solid form on a die and carries out simulation operation for bending the workpiece completely up to the edge angle according to bending information including the edge angle of each side of the solid form, workpiece condition, tool condition and the like. An elongation amount of the workpiece is obtained by an elongation amount calculation portion and an elongation amount subtraction portion subtracts the elongation amount from a length of each side of the solid form. A development drawing generation portion creates a development drawing and an L-value calculation portion transmits Li value based on this development drawing to the press machine.

5 Claims, 9 Drawing Sheets

FIG.6A
BEFORE DEFORMATION

FIG.6B
DEFORMATION UP TO $\theta k$

PRIOR ART DEVELOPMENT DRAWING

DEVELOPMENT DRAWING ACCORDING
TO THE PRESENT INVENTION

FOLDING LINE GENERATION METHOD FOR BENDING AND BENDING SYSTEM BASED THEREON

CROSS-REFERENCES TO RELATED APPLICATIONS: Not Applicable

STATEMENT REGARDING FEDERALLY SPONSORED RESEARCH OR DEVELOPMENT: Not Applicable

MICROFICHE APPENDIX: Not Applicable

BACKGROUND OF THE INVENTION

1. Field of the Invention

This invention relates to a method for generating a development drawing in which dimension of a solid form is changed according to an elongation amount presented when a sheet material is changed up to a target angle (including a spring-back) and entering a folding line taking into account the elongation amount into this development drawing.

2. Description of the Prior Art

Figure 1:
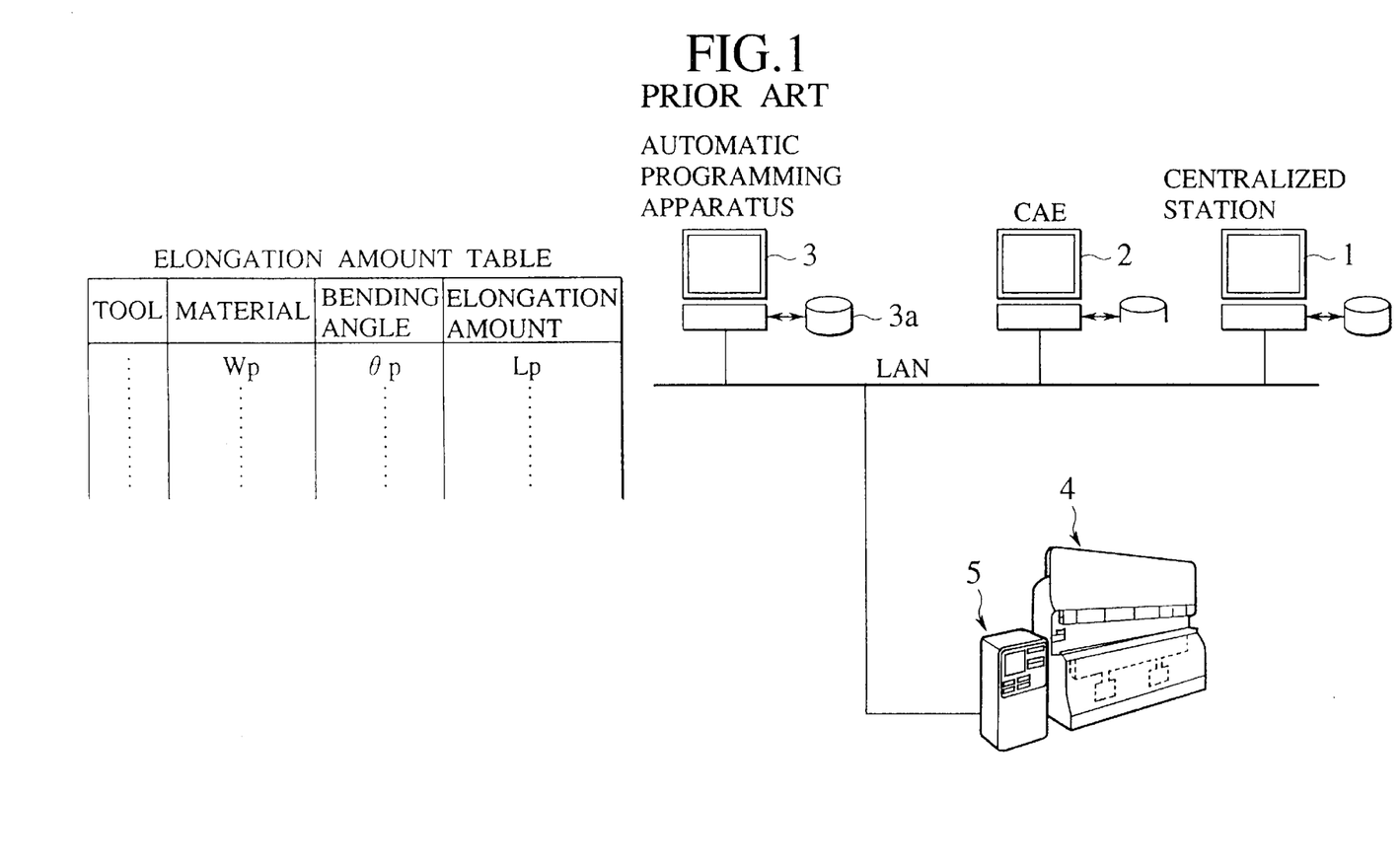
FIG. 1 is a schematic structure diagram of a bending machine line control system.

FIG. 1 is a schematic structure diagram of a line control system for a bending machine. The line control system for the bending machine shown in FIG. 1 comprises a centralized station 1, CAE (computer-aided engineering) 2, automatic programming device 3 and NC (numeric control) apparatus 5 for controlling the bending machine 4, these components being connected through a LAN (local area network).

In this system, a processing program (also called NC program) for producing a desired product by bending is created by the automatic programming device 3 and filed in the centralized station 1 corresponding to processing schedule.

Then, the centralized station selects a processing program of a product which has reached a date of scheduled production from a processing schedule and transmits it to the NC apparatus 5 so as to operate the bending machine 4.

Figure 2:
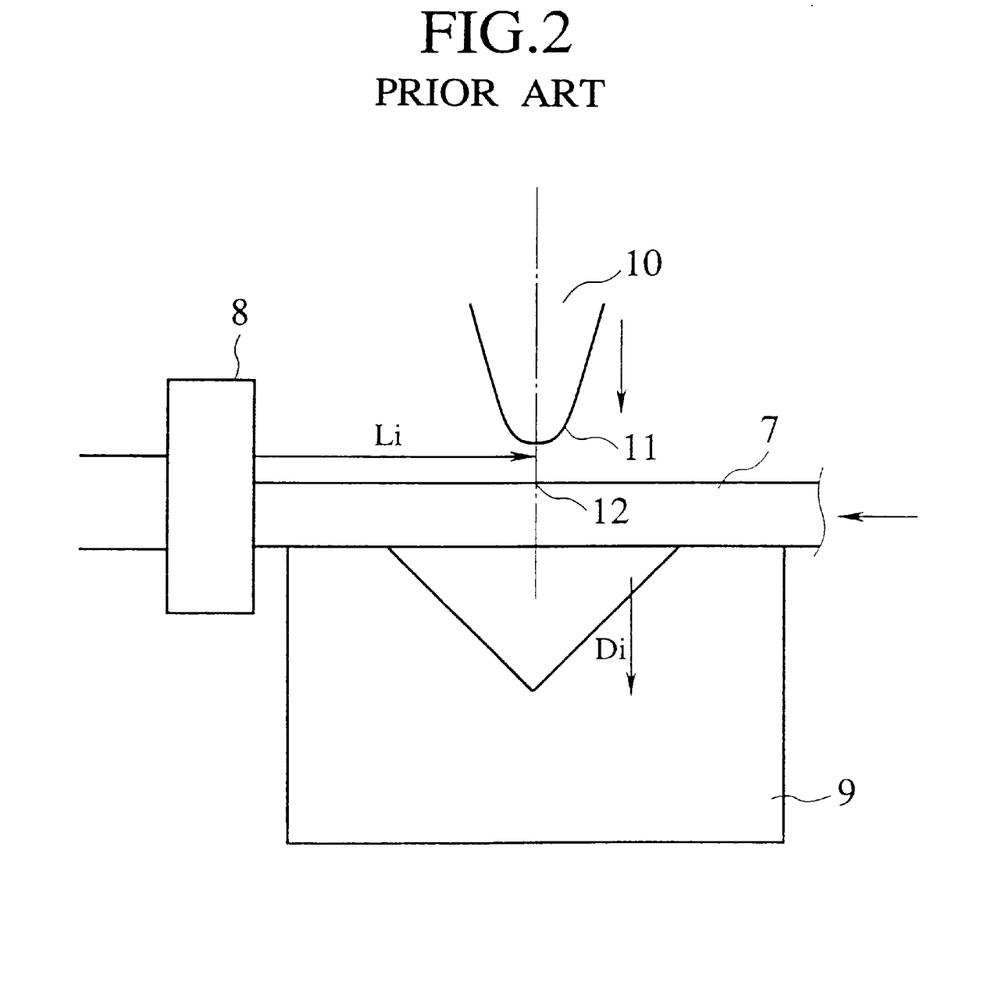
FIG. 2 is an explanatory diagram for explaining a bending operation of a bending machine.
Figure 3:
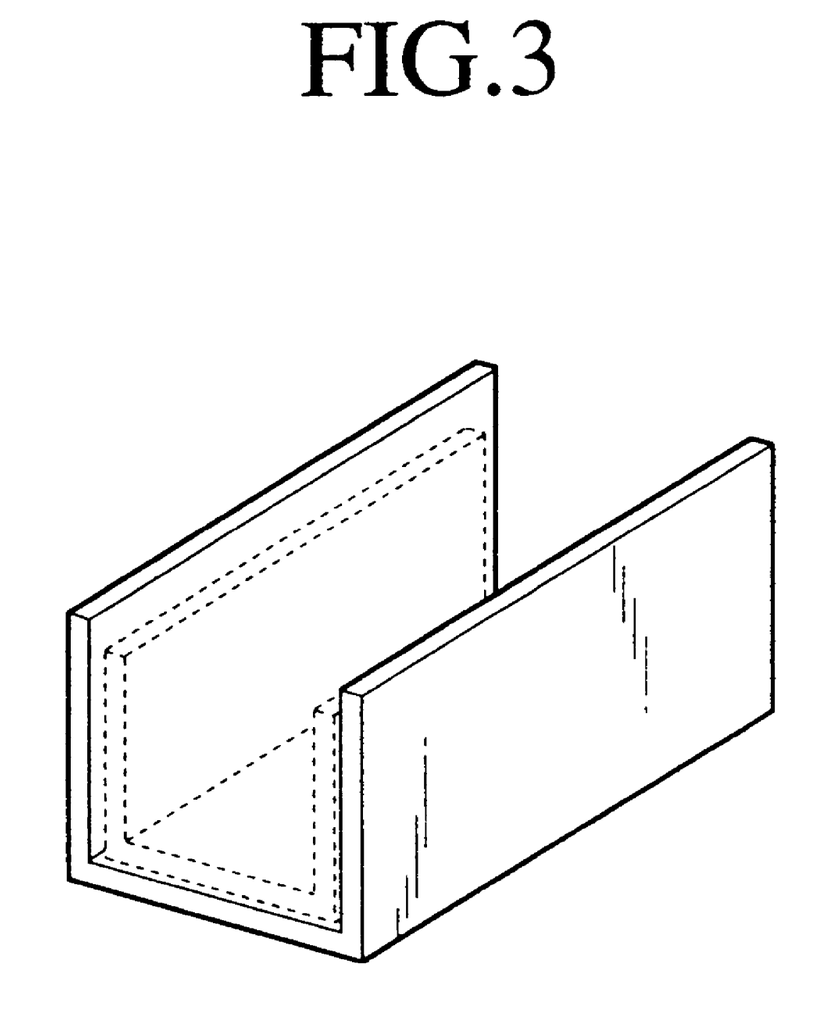
FIG. 3 is a view showing a difference of size between a desired product (dotted line) and an actually produced product (solid line)

When the sheet material is bent using the bending machine 4, as shown in FIG. 2, the sheet material 7 (hereinafter referred to as workpiece 7) is placed on a die 9 while pressed against a back gauge 8 horizontally and a punch 10 is descended up to a target Di value so as to bend the workpiece 7.

At this time, the back gauge 8 is controlled so that when a tip 11 of the punch 10 makes contact with the workpiece 7, the tip 11 of the punch 10 is located on a bending line 12 (reach Li) of the workpiece 7.

It is known that with the aforementioned bending, the workpiece 7 is extended. Therefore, according to the prior art, when a processing program is created by an automatic programming apparatus 3, an operator enters a folding line into a development drawing according to a preliminarily prepared elongation amount table (punch type—material—bending angle—elongation amount) by operating the automatic programming apparatus 3.

However, when the operator enters a folding line taking into account an elongation amount, he must refer to the elongation amount table preliminarily prepared upon the entry. Thus, there is a possibility that the operator may enter the folding line into an improper position.

Although the elongation amount table is determined depending on punch type, material, bending angle and the like, there is not always prepared a punch and a die mentioned in the elongation amount table on a machine tool. In this case, bending is carried out using a substitute punch or a substitute die on the machine tool. Thus, even if the operator enters a folding line based on the elongation amount table, when a workpiece is actually processed, there is sometimes a case in which a desired product (dotted line) may be different from an actually produced product (solid line).

SUMMARY OF THE INVENTION

Accordingly, the present invention has been proposed to solve the aforementioned problem, and it is an object of the present invention to provide a method for creating a folding line for bending wherein a folding line taken into account an elongation amount can be automatically entered depending on tool condition and a bending system based on the method.

To achieve the aforementioned object, there is provided a folding line generation method for bending, comprising the steps of: creating a solid form from an input trihedral drawing; setting sheet material condition for obtaining the solid form, tool condition of punch and die for bending a sheet material, and a target angle for obtaining an edge angle of the solid form; obtaining a target stroke amount of each sheet material for obtaining the target angle by successively placing the sheet material for generating an edge angle of the solid form on a die and changing the sheet material according to elastoplasticity finite-element method while descending the punch each time when the sheet material is placed on the die; obtaining an elongation amount of the sheet material successively each time when the target stroke amount of the sheet material is obtained, from dimension of the sheet material and a deformed image of the sheet material; obtaining solid form data by subtracting the elongation amount from each side of the solid form when the elongation amount of each sheet material for forming the solid form is obtained; and generating a development diagram from the solid form data and successively entering a folding line based on the solid form into the development diagram.

According to a preferred embodiment of the present invention, the target angle according to the elastoplasticity finite-element method is an angle after spring-back which occurs when the punch is released from the die.

According to another preferred embodiment of the present invention, the sheet material condition, tool condition and edge angle are obtained from the solid form.

Further, to achieve the aforementioned object, there is provided a bending system including a network comprising a simulation apparatus and a press machine, the press machine comprising changed tool information transmitting portion which receives reach information for locating a punch and tool information when the reach information is obtained, from the simulation apparatus and, when having no tool relating to the received tool information, transmits changed tool information to the simulation apparatus, the simulation apparatus comprising: memory for storing a plurality of tool information for use in the press machine; three-dimensional drawing generation portion for generating a solid form from an input trihedral drawing; workpiece bending simulation portion which, after reading sheet material condition for obtaining the solid form, tool condition of punch and die for bending the sheet material, and a target angle for obtaining an edge angle of the solid form from the solid form, obtains a target stroke amount for each sheet material for obtaining the target angle by successively placing the sheet material for generating an edge angle of the solid form on a die and changing the sheet material according to elastoplasticity finite-element method while descending the punch, each time when the sheet material is placed on the die; elongation amount calculation portion for obtaining an elongation amount of the sheet material successively each time when the target stroke amount of the sheet material is obtained, from dimension of the sheet material and a deformed image of the sheet material; elongation amount subtraction portion for obtaining the solid form by subtracting an elongation amount obtained by the elongation amount calculation portion from each side of the solid form; development drawing generation portion for generating a development drawing from the solid form data and generating a folding line based on the solid form successively in the development drawing; L-value calculation portion for obtaining the reach according to the folding lines generated by the development drawing generation portion and transmitting the reach to the press machine; and changed tool setting portion for retrieving tool information corresponding to the changed tool information transmitted from the press machine from the memory and setting the retrieved tool information in the workpiece bending simulation portion, the workpiece bending simulation portion obtaining the target stroke amount again according to the retrieved tool information.

According to a preferred embodiment of the present invention, the simulation apparatus is connected to the press machine through local a area network.

The nature, principle and utility of the invention will become more apparent from the following detailed description when read in conjunction with the accompanying drawings.

DETAILED DESCRIPTION OF THE PREFERRED EMBODIMENTS (First Embodiment)

Figure 4:
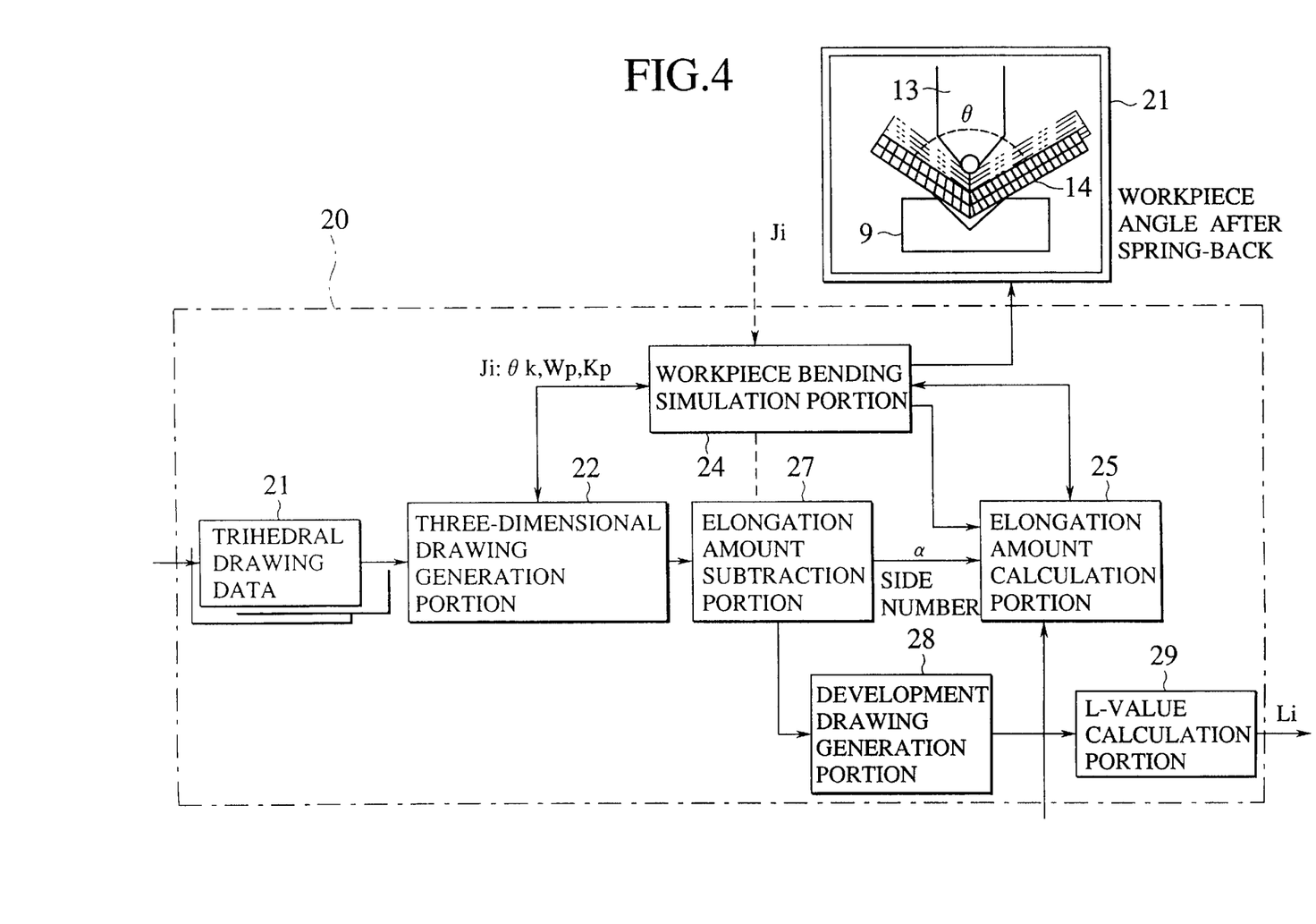
FIG. 4 is a schematic structure diagram of the bending simulation apparatus to which folding line generation method for bending according to the present invention is applied.

FIG. 4 is a schematic diagram of a bending simulation apparatus to which folding line generation method for bending according to the present invention is applied. The bending simulation apparatus 20 shown in FIG. 4 is a function incorporated in the automatic programming apparatus.

This bending simulation apparatus 20, after generating a solid form from trihedral drawing data, conducts simulation operation for bending a workpiece completely up to an edge angle θk, according to bending information Ji including the edge angle θk of each side of the solid form, workpiece condition Wp, tool condition kp and the like, with the workpiece placed on a die to form the edge angle θk of the solid form.

Then, a development drawing in which an elongation amount α of the workpiece is subtracted from a length of each side of the solid form is created and Li value based on this development drawing is transmitted to a press machine.

(Detailed structure)

The bending simulation apparatus 20 shown in FIG. 4 comprises a three-dimensional drawing generation portion 22 for creating a solid form from the trihedral drawing data 21, workpiece bending simulation portion 24, elongation amount calculation portion 25, elongation amount subtraction portion 27, development drawing generation portion 28 and L-value calculation portion 29.

The workpiece bending simulation portion 24 reads all the edge angles of the solid form from the three-dimensional drawing generation portion 22 and changes the workpiece geometrically according to the bending information Ji including the workpiece condition Wp for forming this edge angle θk (target angle θi-θp), tool condition kp and the like, displaying deformed images 14 of the workpiece, obtained by elastoplasticity finite-element method, on the display portion 21. The aforementioned bending information Ji may be entered by an operator.

The deformed image of this workpiece is a deformed image obtained when the angle after spring-back θ (after loading weight is released) produced when the punch sectional image 13 is released coincides with a target angle θi. The target D value for obtaining this target angle θi is automatically obtained by convergence calculation.

The elongation amount calculation portion 25 obtains dimension La of the deformed image 14 of the workpiece when the workpiece bending simulation portion 24 deforms the workpiece, obtaining the edge angle θp (target angle θi). Then, the elongation amount calculation portion 25 obtains a difference between this dimension La (La is provided with a numeral) and dimension Lo of the workpiece loaded on a die 9 to obtain the edge angle, as an elongation amount α when the workpiece is bent at the target angle θi, and transmits this to the elongation amount subtraction portion 27. With transmission of the elongation amount α, the number of a side of the solid form is also transmitted at the same time.

The elongation amount subtraction portion 27 reads a side Lk of the solid form, corresponding to this elongation amount α from the three-dimensional drawing generation portion 22, each time when the elongation amount calculation portion 25 obtains the elongation amount α, generates a solid form data by subtracting the elongation amount α from the side Lk, and transmits it to the development drawing generation portion 28.

The development drawing generation portion 28 reads solid form data from the elongation amount subtraction portion 27 and generates a folding line on which the punch 12 is applied, in the solid form data.

The L-value calculation portion 29 obtains back gauge position (Li) according to the folding line position from the development drawing generation portion 28 and outputs it to the press machine.

(Description of the operation)

Figure 5:
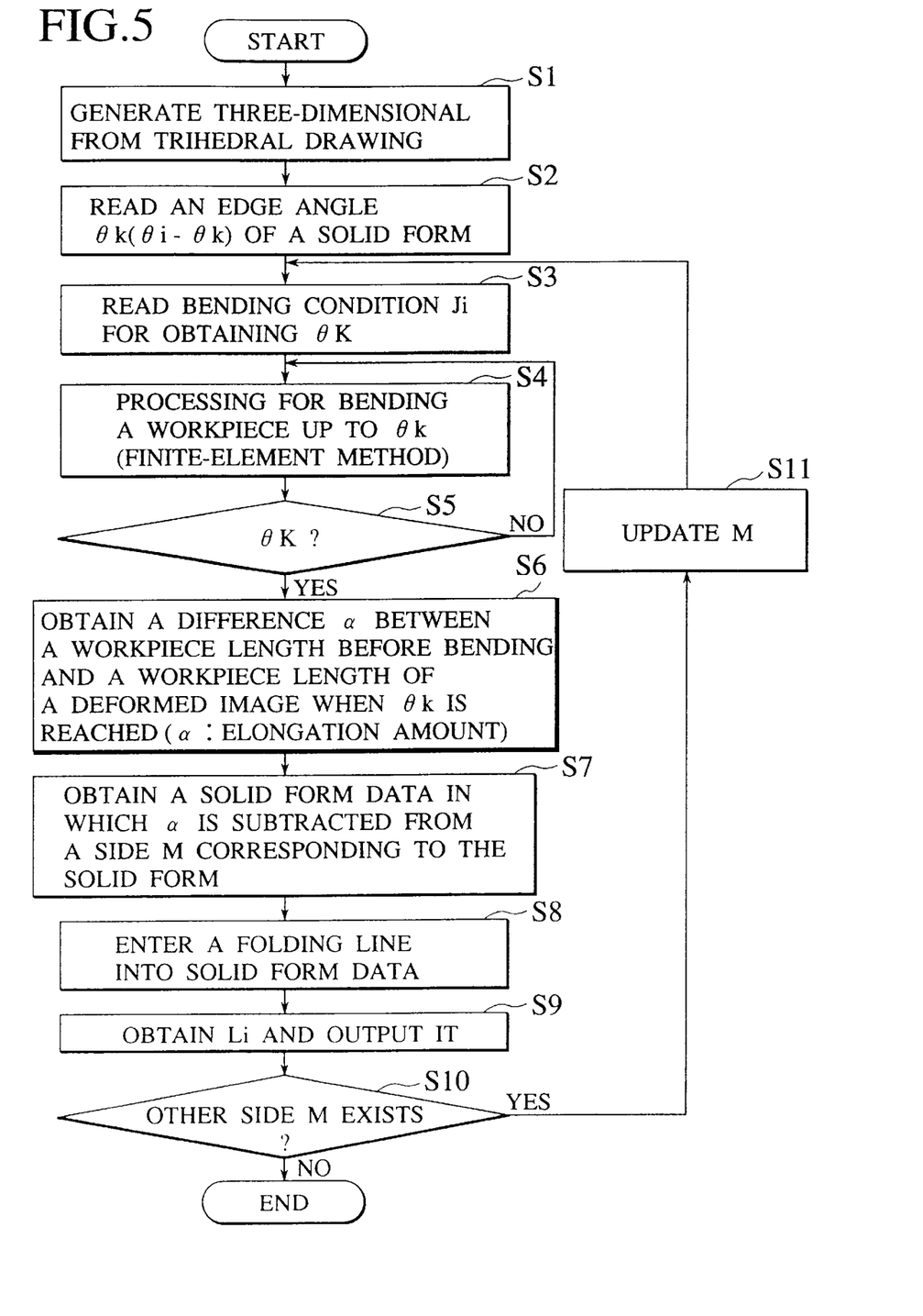
FIG. 5 is a flow chart showing processing steps of the folding line generation method for bending.

FIG. 5 is a flow chart showing processing steps according to the present embodiment. First, the three-dimensional drawing generation portion 22 reads trihedral drawing data 21 and creates solid form from this trihedral drawing data 21 (S1).

Next, the workpiece bending simulation portion 24 reads the bending angle θk (θi←θk) of predetermined two sides M of the solid form (S2) and then reads the bending information Ji including workpiece condition Wp, tool condition kp and the like from the three-dimensional drawing generation portion 22 so as to obtain the angle θk (θi←θk) (S3).

Then, by descending the punch until the bending angle θk (θi←θk) of each vertex of predetermined two sides M of the solid form, simulation processing for obtaining deformed image of the workpiece is carried out (S4). The workpiece bending simulation portion 24 memorizes the deformed images 14 of the workpiece obtained by using the finite-element method while deforming the workpiece geometrically and displays it on the display portion 21.

This deformed image of the workpiece is a deformed image produced when the angle θ after the spring-back coincides with the target angle θk (θi←θk) when the punch sectional image 13 is released.

The target D value of the stroke amount for obtaining this target angle θk is automatically obtained by the convergent operation. In this convergent operation, the workpiece deformation linear data is differentiated with Di to obtain Di+1 and Di-1 on the D-value axis and Di-1 is added to half of a difference between Di+1 and Di-1 so as to obtain the correction Dp value. Then, the arithmetic operation for advancing the punch 13 up to this correction Dp value is carried out successively up to the target angle θk.

Next, the workpiece bending simulation portion 24 determines whether the transition angle θ of the workpiece has reached the target angle θk (S5) and if the target angle Ok is not reached, the processing is returned to step S4.

When in step S5, the workpiece bending simulation portion 24 determines that the target angle θk has been reached in the simulation processing, the elongation amount calculation portion 25 obtains a difference between the dimension La of the deformed image 14 produced when the memorized target angle θk is reached and the dimension Lo of the initial workpiece before the workpiece is bent, as the elongation amount α when the workpiece is bent at the target angle θi and transmits it together with the number M of a side of the solid form (S6).

Figure 6A:
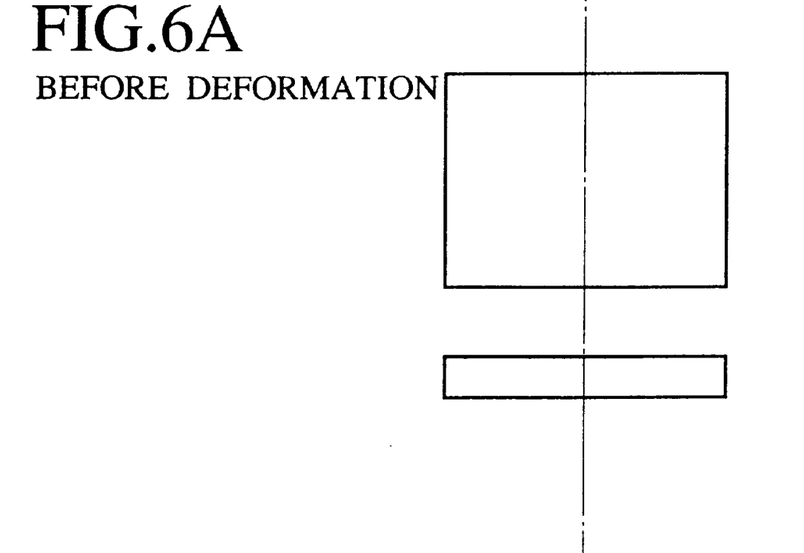
FIGS. 6A and 6B are diagrams for explaining a method for calculation of the elongation amount.
Figure 6B:
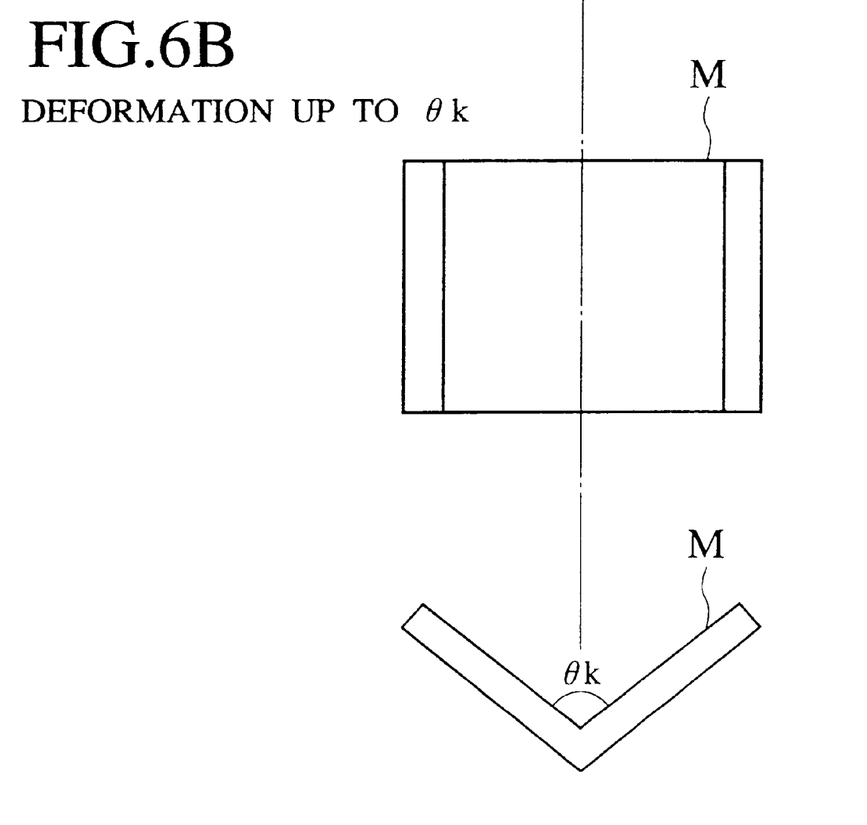

That is, the elongation amount calculation portion 25 handles a difference between the workpiece length before deformation as shown in FIG. 6A and the workpiece length after the deformation as shown in FIG. 6B as the elongation amount α. At this time, the elongation amount each in the horizontal direction and vertical direction is obtained. A difference between the workpiece length Lox before deformation as shown in FIG. 6A and the workpiece length Lax after deformation up to θk as shown in FIG. 6B is treated as the elongation amount αx, and a difference between the workpiece length Loy before deformation as shown in FIG. 6A and the workpiece length Lay after deformation up to θk as shown in FIG. 6B is treated as the elongation amount αy.

Next, the elongation amount subtraction portion 27 reads a side m of the solid form corresponding to a side M from the elongation amount calculation portion 25, obtains solid form data by subtracting the elongation amount α from this side m (S7) and transmits it to the development drawing generation portion 28.

The development drawing generation portion 28 creates a development diagram from transmitted solid form data and executes processing for drawing a folding line in the development diagram (S8).

Figure 7A:
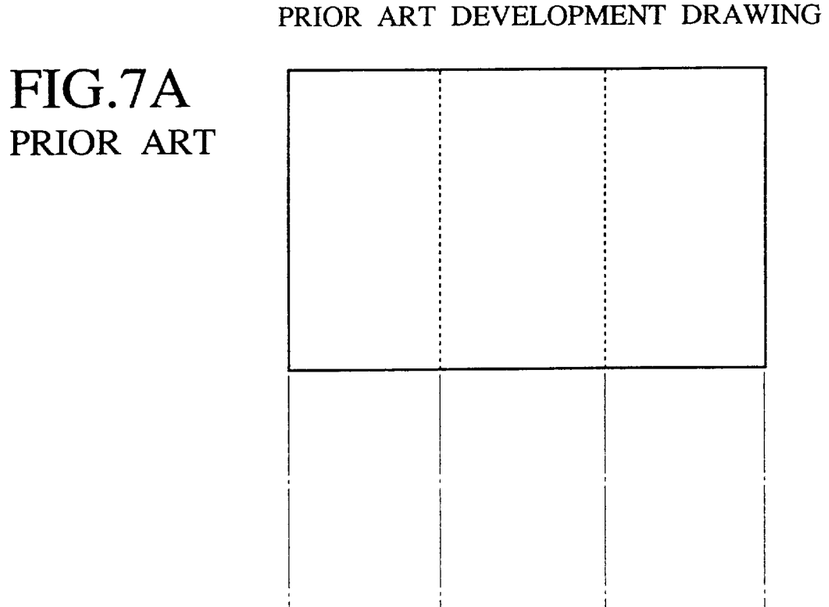
FIGS. 7A and 7B are diagrams for comparing a conventional development drawing with a development drawing according to the present invention.
Figure 7B:
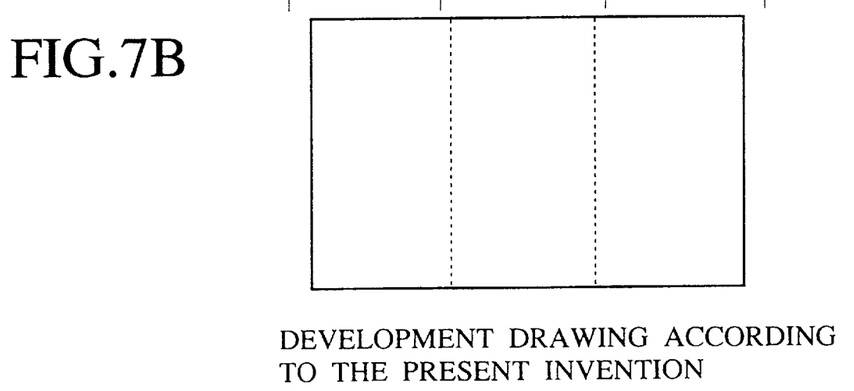

Because the folding line (shown by dotted line) is entered into the development diagram shown in FIG. 7B which is slightly reduced from a conventional development diagram shown in FIG. 7A, intervals between the folding lines are reduced.

Next, the L-value calculation portion 29 obtains back-gauge position (Li) from the folding line position from the development drawing generation portion 28 and outputs it to the press machine (S9).

Then, whether or not other side M exists in the solid form is determined (S10) and if the other side M exists, the side M is updated and the processing is returned to step S2(S11).

(Example of application)

Figure 8A:
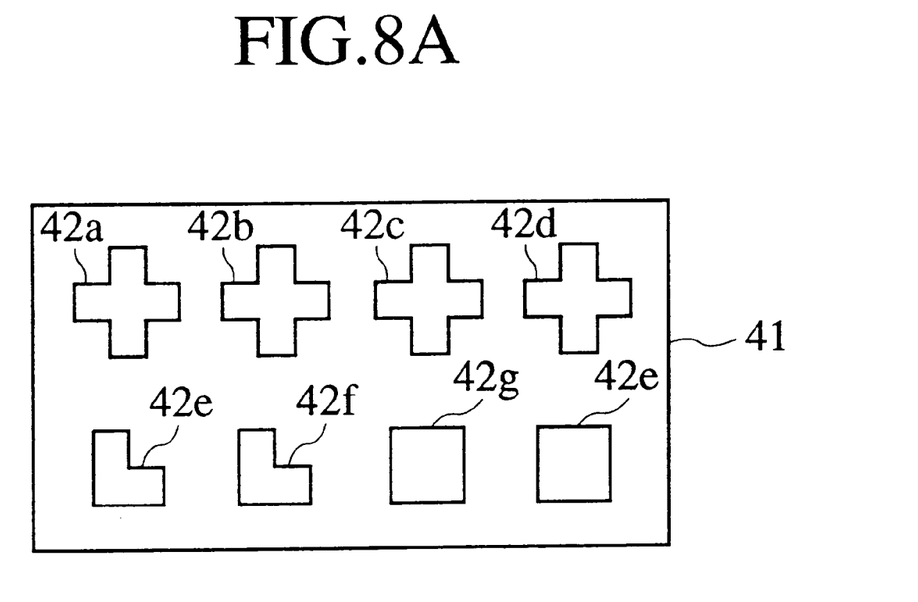
FIGS. 8A and 8B are diagrams for explaining an application example.
Figure 8B:
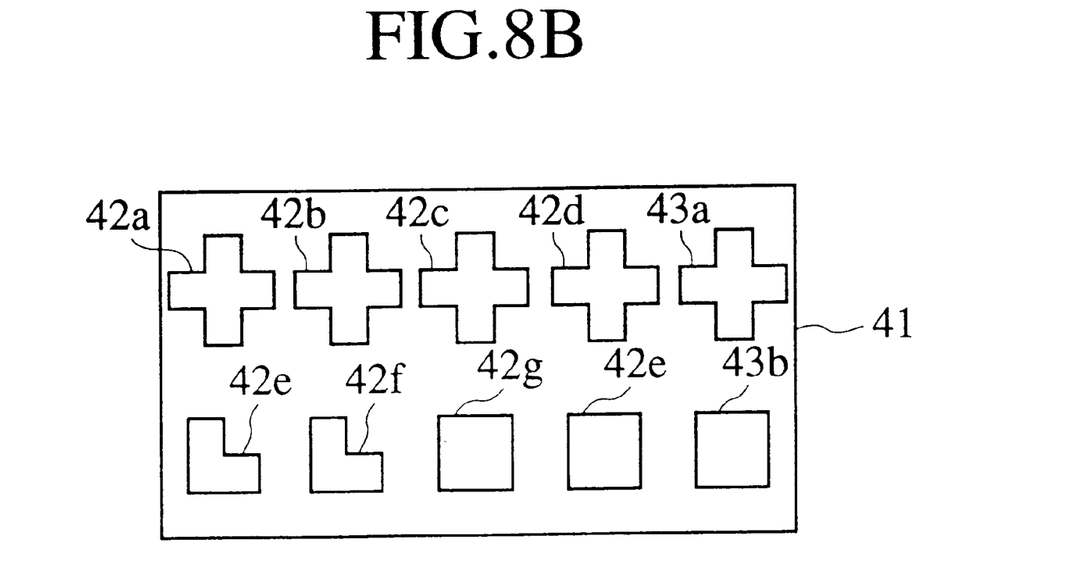

Although according to the conventional method, only eight products can be nested like products 42a, 42b, ... 42e in a sheet material 41 shown in FIG. 8A, when the elongation amount according to the aforementioned embodiment 1 is obtained, a required area of the sheet material can be reduced with respect to FIG. 8A by adjusting the punch condition and carrying out processing for subtracting most advantageous elongation amount. Thus, the products 43a, 43b as well as the eight products 42a, 42b, ... 42e as shown in FIG. 8B can be nested. Therefore, the workpiece which is a sheet material can be effectively utilized.

(Embodiment 2)

Figure 9:
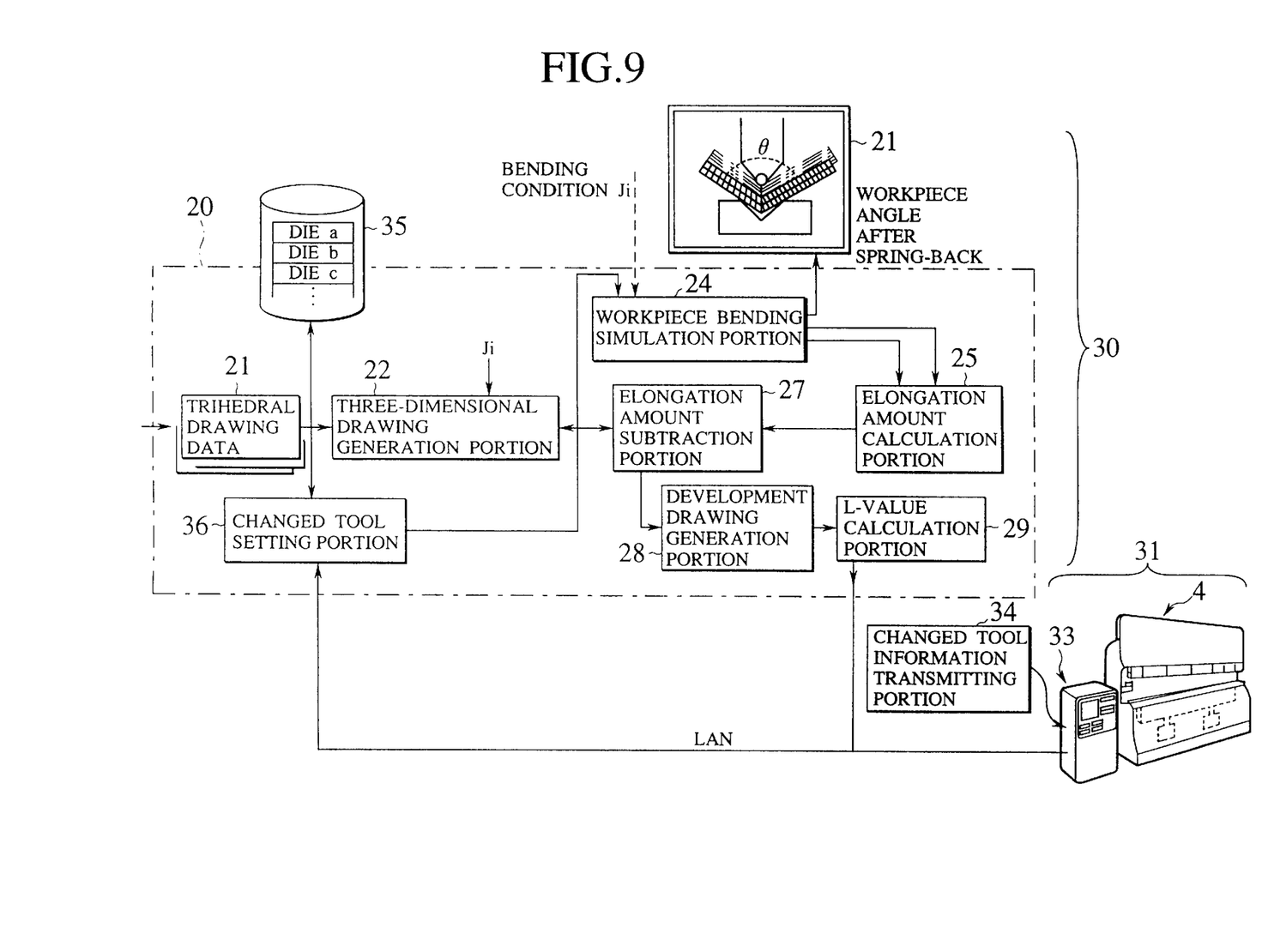
FIG. 9 is a schematic structure diagram of an embodiment of the bending system according to the present invention.

FIG. 9 is a schematic structure diagram of another embodiment of the workpiece bending processing system according to the present invention. The structure of the present embodiment comprises the simulation apparatus 30 and press machine 31 as shown in FIG. 9.

The simulation apparatus 30 shown in FIG. 9 creates a solid form from trihedral drawing data and then carries out simulation operation for bending the workpiece completely up to the bending angle θk according to the bending information Ji including the bending angle θk of each plane of the solid form, input workpiece condition Wp, tool condition kp and the like. At this time, a development diagram in which the elongation amount α of the workpiece is subtracted from the length of each side of the aforementioned solid form is created and the Li value based on this development diagram is transmitted to the press machine.

When it is notified from the press machine that a changed tool Gi which is different from the aforementioned tool condition kp will be used, bending information Ji in which tool condition kp of the aforementioned bending information J is changed to the tool condition ki for the changed tool Gi is produced so as to generate a new development diagram in the workpiece bending simulation portion 24 and a new Li value is transmitted.

(Detailed structure of each apparatus)

The simulation apparatus 30 comprises the three-dimensional drawing generation portion 22 for creating a solid form from the trihedral drawing data 21, workpiece bending simulation portion 24, elongation amount calculation portion 25, elongation amount subtraction portion 27, development drawing generation portion 28 and L-value calculation portion 29.

The simulation apparatus 30 further comprises a file 35 storing die information ki (ka, kb, ... ) about a plurality of tools (die, punch) to be used in the press machine 31, and changed tool setting portion 36 which, when it is notified from the press machine 31 that the tool will be changed, retrieves tool condition ki corresponding to that changed tool Gi from the file 35, generates bending information ji in which the tool condition in the aforementioned bending information Ji is changed to the tool condition ki of that changed tool Gi and sets it in the workpiece bending simulation portion 24.

On the other hand, the NC machine 33 of the press machine 31 comprises the changed tool information transmitting portion 34. The changed tool information transmitting portion 34, when the changed tool Gi different from the tool condition kp in the bending information Ji obtained when the Li value transmitted by the simulation apparatus 30 is obtained is used, transmits that changed tool Gi to the simulation apparatus 30 through LAN.

That is, in the second embodiment, the following effects are attained. When the Li value based on the tool condition kp input on the simulation apparatus 30 is obtained and transmitted to the press machine 31, there is not always a tool fitting to that tool condition kp on the press machine 31 on site.

In this case, generally site operators replace the tool with a substitute tool Gi.

However, when a tool the Li value of which is different from a tool to be actually used, there occurs a slight difference in the elongation amount of the workpiece.

As described above, the NC machine 33 is provided with the changed tool information transmitting portion 34 and the simulation apparatus 30 is provided with the file 35 and changed tool setting portion 36. As a result, when a changed tool Gi different from the tool condition kp in the bending information Ji obtained at the same time when the Li value transmitted by the simulation apparatus 30 is obtained is utilized, the bending simulation is carried out again according to the ki corresponding to the changed tool Gi and then a new Li value based on the ki of the changed tool Gi is obtained and transmitted to the press machine 31.

Therefore, the site operators do not have to change the Li value on site even if the tool is replaced with a substitute, thereby ensuring an excellent operation efficiency. Further, even an unskilled operator can replace the tool easily and execute press workpiece.

Meantime, it is permissible to use CAM (computer aided manufacturing) apparatus which specifics bending line and order and tool, instead of the press machine.

It should be understood that many modifications and adaptations of the invention will become apparent to those skilled in the art and it is intended to encompass such obvious modifications and changes in the scope of the claims appended hereto.

What is claimed is:

1. A folding line generation method for bending, comprising:

creating a solid form from an input trihedral drawing;

setting a sheet material condition for obtaining said solid form, tool conditions of a punch and die for bending a sheet material, and a target angle for obtaining an edge angle of said solid form;

obtaining a target stroke amount of each sheet material for obtaining said target angle by successively placing the sheet material for generating an edge angle of said solid form on a die and changing the sheet material according to an elastoplasticity finite-element method while lowering said punch each time when said sheet material is placed on the die;

successively obtaining an elongation amount of said sheet material each time when the target stroke amount of said sheet material is obtained, from a dimension of said sheet material and a deformed image of said sheet material;

obtaining solid form data by subtracting the elongation amount from each side of said solid form when the elongation amount of each sheet material for forming said solid form is obtained; and generating a development diagram from said solid form data and successively entering a folding line based on the solid form into the development diagram.

2. The folding line generation method for bending according to claim 1 wherein the target angle according to said elastoplasticity finite-element method is an angle after spring-back which occurs when said punch is released from the die.

3. The folding line generation method for bending according to claim 1 wherein said sheet material condition, tool condition and edge angle are adapted to be obtained from said solid form.

4. A bending system including a network comprising a simulation apparatus and a press machine, said press machine comprising a changed tool information transmitting portion adapted to receive reach information for locating punch and tool information when said reach information is obtained, from said simulation apparatus and, is further adapted to transmit changed tool information to said simulation apparatus, when no tool relating to the received tool information is present, said simulation apparatus comprising:

memory adapted to store a plurality of tool information for use in said press machine;

three-dimensional drawing generation portion adapted to generate a solid form from an inputted trihedral drawing;

a workpiece bending simulation portion is adapted to obtain a target stroke amount for each sheet material for obtaining a target angle by successively placing the sheet material for generating an edge angle of said solid form on a die and changing the sheet material according to an elastoplasticity finite-element method while lowering said punch, each time when said sheet material is placed on said die, after reading a sheet material condition for obtaining said solid form, tool condition of a punch and die for bending said sheet material, and said target angle for obtaining an edge angle of said solid form from said solid form;

an elongation amount calculation portion adapted to successively obtain an elongation amount of said sheet material each time when the target stroke amount of said sheet material is obtained, from a dimension of said sheet material and a deformed image of said sheet material;

an elongation amount subtraction portion adapted to obtain the solid form by subtracting an elongation amount obtained by said elongation amount calculation portion from each side of said solid form;

a development drawing generation portion adapted to generate a development drawing from said solid form data and further adapted to generate a folding line based on the solid form successively in the development drawing;

an L-value calculation portion adapted to obtain said reach according to said folding lines generated by said development drawing generation portion and transmitting said reach to said press machine; and a changed tool setting portion adapted to retrieve, from said memory, tool information corresponding to said changed tool information transmitted from said press machine and further adapted to set said retrieved tool information in said workpiece bending simulation portion, said workpiece bending simulation portion adapted to obtain said target stroke amount again according to said retrieved tool information.

5. A bending system according to claim 4 wherein said simulation apparatus is adapted to connect to said press machine through a local area network.

* * * * *